March 28, 1961 F. BLOCH 2,976,992
PROCESS OF SORTING PISTACHIO NUTS
Filed Dec. 3, 1958
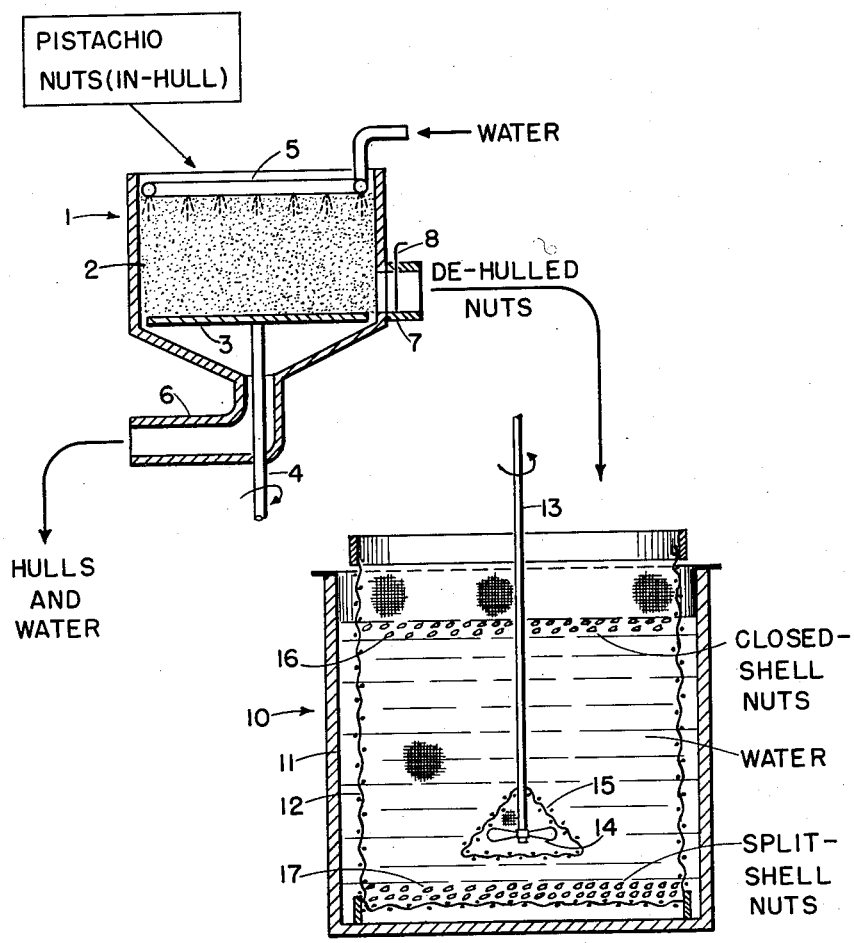
FELIX BLOCH
INVENTOR

2,976,992
PROCESS OF SORTING PISTACHIO NUTS

Felix Bloch, Oakland, Calif., assignor to the United States of America as represented by the Secretary of Agriculture Filed Dec. 3, 1958, Ser. No. 778,038

2 Claims. (Cl. 209—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates in general to the treatment of pistachio nuts. The primary object of the invention is the provision of novel processes for sorting or grading pistachio nuts. Further objects and advantages of the invention will be evident from the following description wherein parts and percentages are by weight, unless otherwise specified.

The single figure is the annexed drawing illustrates apparatus with which the process of the invention may be carried out.

It is well known in the art to which the invention pertains that orchard-run lots of pistachio nuts are not of uniform grade but contain nuts of varying commercial value. Primarily, any orchard-run lot will be found to contain (a) split nuts and (b) unsplit nuts. Those in the first category are referred to as split nuts because their shells are partly open along their seams. Botanically, this is described as a splitting of the endocarp into two valves along the keel. The appearance of these nuts may be likened to a partly open clam shell. These split nuts are of the highest quality as they contain mature, plump, full-sized kernels. Also they are preferred by the consumer because the kernal is more readily removed from the shell. The unsplit (closed-shell) nuts are of lower value because in most of them the kernels are small and insignificant. Closed-shell nuts of such grade are often called "empties." A portion of the nuts having closed shells may contain kernels of reasonable size but they are generally smaller than the kernels in the split nuts. In order for growers to obtain a good price for their crop it is necessary to sort the nuts to segregate the split nuts from the less-desirable grades. Mechanical devices used for sorting other crops are not useful for grading pistachio nuts and generally growers will segregate their crop by hand. This of course is an unsatisfactory, arduous procedure.

In accordance with the invention, the sorting is accomplished by a simple and effective method requiring only inexpensive equipment. To this end, the nuts are introduced into a body of water and centrifugal action is applied to displace the air trapped within the split nuts. The application of the centrifugal action is then discontinued whereby a portion of the nuts rise to the upper level of the body of water and another portion of the nuts sink to the bottom of the body of water. The nuts which float and those which sink are separately removed from the water. Thereby the original batch of nuts is divided into two fractions: (1) floaters and (2) sinkers.

The first fraction (floaters) contains mostly the low-grade nuts, that is, the closed-shell nuts particularly those having small, immature kernels or "empties." The second fraction (sinkers) contains the high-grade nuts, that is, the split nuts. The second fraction may also contain the closed-shell nuts containing more mature kernels, particularly if the nuts are in an undried condition when subjected to the sorting process.

The step of subjecting the nuts to centrifugal action may be accomplished in various ways. For example, the water and nuts may be introduced into a vessel which is then rotated to develop the centrifugal force. If desired, the equipment used for this purpose may be a conventional centrifuge equipped with an imperforate bowl. In the alternative, the vessel itself is not rotated but rotation is applied only to the contents, that is, the water and nuts. To this end, the water and nuts are placed in a vessel provided with means therein for rotating the contents. This means may take the form of a rotatable device such as a propeller, impeller, disc, vanes, baffles, or the like. Conventional devices used for high-speed mixing and agitating of liquids are eminently suitable for use in the process. Generally, where a rotating propeller or the like is used it is preferred to employ a guard of screening or the like to prevent the propeller blades from striking and breaking the nuts.

It is thus evident that various forms of equipment are suitable for use in the process of the invention. The particular construction of the device used is of no moment as long as the nuts are caused to rotate at a sufficient speed that air trapped with the split nuts is displaced by water. Such items as speed of rotation and time during which the rotation is applied will vary depending on such considerations as the size of the equipment, particularly as it affects the radius of rotation, the efficiency with which the mass of nuts and water is rotated, etc. In any particular situation, a simple test may be employed to determine when the centrifugal force has been sufficiently applied. To this end, the rotation is discontinued and the nuts which float in the body of water are observed. If this fraction contains more than a small proportion of split nuts, the rotation is continued for a while longer, or the speed of rotation may be increased, and the test repeated. The rotation is continued until the point is reached when essentially all the split nuts will sink when the rotation is shut off.

The step of applying centrifugal force to the nuts while in a body of water is a critical feature of the process of the invention. Thus, if the nuts are merely dumped into water, no effective sorting will be attained. In such case the closed-shell nuts with immature kernels will float because of their low density and at the same time the split nuts will also float because air is trapped in their open shells. This entrapment of air gives the split nuts a false density such that they float. The net result is that both low and high quality nuts will float and no successful sorting can be attained. However, when centrifugal force is applied, the entrapped air is displaced by water with the result that the split nuts assume their proper density and sink. The closed-shell nuts having immature kernals are not affected by application of the centrifugal force and retain their property of floating in water.

Prior to applying the sorting process of the invention, the nuts are dehulled, that is, the outer hull enveloping the kernel and shell is removed. Although any method of dehulling may be employed, this step is preferably accomplished by an abrasive peeling machine as described hereinbelow. An advantage accruing from use of this device is that it exerts a centrifugal force which contributes to displacement of air trapped within the split nuts.

The process of the invention may be applied to nuts in a dried or undried condition. Thus, for example, the nuts after drying in the hull may be dehulled and subjected to the sorting process. In the alternative, the nuts fresh from harvest may be dehulled and subjected to the sorting process. Depending on the alternative chosen, a certain variation in result will be obtained, as follows.

(a) If the nuts after drying in-hull are dehulled and subjected to the sorting process of the invention, the sinker fraction will contain practically all the split nuts whereas all the unsplit nuts will be in the floater fraction.

(b) If the nuts, immediately after harvesting (i.e., without drying), are dehulled and subjected to the sorting process of the invention the sinker fraction will contain, in addition to all the split nuts, those unsplit nuts which contain developed kernels and which therefore are of saleable quality. The unsplit nuts with immature kernels will be in the floater fraction.

If desired, the sinker fraction from alternative procedure (b), above, may be further treated to separate the split nuts from the better-grade unsplit nuts. To accomplish this, the sinker fraction is dried and then again subjected to the sorting process of the invention. This will result in separation of a sinker fraction containing only the split nuts and a floater fraction containing the better-grade unsplit nuts. As a net result the original lot of nuts is separated into three fractions—the split nuts with the highest sales value, the unsplit nuts with developed kernels, and the unsplit nuts with no or shriveled content. Such procedure is illustrated in Example II.

Reference is now made to the attached drawing which depicts a flow sheet of the process including apparatus, shown in cross-section, for effectuating the various steps. The orchard-run in-hull pistachio nuts (dry or undried) are fed into abrasive peeler 1 for de-hulling. Peeler 1 includes cylindrical wall 2 coated with abrasive grains and a rotatable circular disc 3 also coated with abrasive grains. Disc 3 is mounted on shaft 4 which is rotated by a suitable device such as an electric motor (not illustrated). In operation, the rotation of disc 3 causes the nuts to tumble about and rotate within device 1 whereby the hulls are removed by contact with the abrasive surfaces of walls 2 and disc 3. During the operation, water is sprayed onto the mass via pipering 5 provided with perforations. The hulls and other debris are washed out of the device via conduit 6. When the nuts are properly de-hulled they are removed via conduit 7 provided with slide valve 8.

The de-hulled nuts are then introduced into sorting device 10. This device includes tank 11, basket 12 made of screening, and an agitator consisting of shaft 13 and propeller 14. Shaft 13 is rotated by a suitable device such as an electric motor (not illustrated). A cage 15 having a generally-conical shape and made of screening is positioned about propeller 14 and attached at its upper end to shaft 13. This cage prevents the propeller from directly contacting the nuts. (Such contact would tend to break them.)

In operation, tank 11 is filled with water and the de-hulled nuts are introduced into basket 12. Shaft 13 is then rotated at a speed sufficient to induce a thorough agitation and a rapid circulation of the nuts about the interior of basket 12. This rotational effect is continued for a time long enough to ensure removal of air entrapped within the split nuts. Depending on the efficacy of the agitator used this result may be attained in a few minutes or less. In any particular case, the proper time for agitation can be determined by discontinuing the operation and examining the floater fraction. If this fraction contains more than a small proportion of split nuts, the rotation is continued for a while longer and the test repeated. In any event, after the required time to ensure displacement of air from the split nuts, the agitator is shut down. The floaters 16 are removed, for example by dipping them out with a perforated ladle. Basket 12 is then raised out of the tank and sinkers 17 are poured out. As noted above, the sinker fraction 17 is the high-quality product containing mostly the split nuts whereas floater fraction 16 is the undesired material—the unsplit nuts.

After the sorting process is completed as described above, the sinkers are dried for example by exposing them to the sun or more preferably by subjecting them to a current of hot air. The floaters may also be dried although they may be discarded when of no practical value.

It is, of course, within the purview of the invention to carry out the sorting process more than once to obtain fractions of maximum uniformity. For example, the sinker fraction from the sorting process may be re-subjected to the same sorting process to separate the small proportion of immature unsplit nuts which may accompany the desired split nuts in the first sorting operation. In like manner, the floater fraction from a first sorting operation may be again subjected to the sorting procedure. It is preferred to dry the fraction from the first sorting operation prior to application of the second sorting operation.

The invention is further demonstrated by the following illustrative examples:

Example I

The starting material used was an orchard-run lot of Trabonella pistachio nuts (in hull) which had been dried by exposing to sun in the field after harvesting. Ten pounds of these nuts were de-hulled by tumbling them in an abrasive peeler as described above. The de-hulled nuts were then sorted in a device as described above. To this end, the de-hulled nuts were placed in a tank holding 100 lbs. of water. The nuts and water were agitated and rotated by the use of "Lightnin" mixer—a device comprising a motor, shaft, and propeller. The propeller of the mixer was prevented from directly striking the nuts by placing a cage of wire screening about the propeller. The propeller was rotated at a speed of about 1750 r.p.m. for one minute while immersed in the mass of nuts and water. The mixer was then stopped and the floaters scooped out with a perforated ladle. Following this the sinkers were separated from the water bath. The sinkers and floaters were then dried separately on trays by subjecting them to a current of air at about 90–100° F. until the nut kernels were crisp (moisture content about 5%).

To test the efficacy of the separation, the floater and sinker fractions were then manually separated into their components of split nuts and unsplit nuts. These sub-fractions were then weighed and the weights used to calculate the efficiency of separation.

The results obtained are tabulated below:

| Fraction | Split nuts, grams | Unsplit nuts, grams |
| --- | --- | --- |
| Floaters | 48 | 935 |
| Sinkers | 2,080 | 20 |
| Total | 2,128 | 955 |

Efficiency of separation of split nuts:

$$\frac{2080}{2128} \times 100 = 97.7\%$$

Efficiency of separation of unsplit nuts:

$$\frac{935}{955} \times 100 = 97.9\%$$

Example II

The starting material used in this experiment was an orchard-run lot of pistachio nuts of the Trabonella variety, immediately after harvest, in undried condition. 15 pounds of these nuts were dehulled, sorted and dried as described in Example I. The results obtained are tabulated below:

| Fraction | Split nuts, grams | Unsplit nuts, grams |
|---|---|---|
| Floaters | 20 | 261 |
| Sinkers | 2,186 | 192 |
| Total | 2,206 | 453 |

Efficiency of separation of split nuts:

$$\frac{2186}{2206} \times 100 = 99.1\%$$

In this case, the sinker fraction contained a substantial proportion of unsplit nuts. These unsplit nuts, however, possessed developed kernels and were of acceptable quality, as they averaged a meat content of 48.8%, compared to 51.05% meat content of the split nuts of this variety. The unsplit nuts in the floater fraction were of little commercial value, as they had a meat content of only 6.5%.

After drying, the sinker fraction was again subjected to the sorting process described in Example I, except that in this case the agitation and rotation of the mixture of nuts and water was continued for 6 minutes. The results of this re-sorting are tabulated below:

| Fraction | Split nuts, grams | Unsplit nuts, grams |
|---|---|---|
| Floaters | 5 | 180 |
| Sinkers | 2,045 | 0 |
| Total | 2,050 | 180 |

Efficiency of re-separation of the split nuts:

$$\frac{2045}{2050} \times 100 = 99.8\%$$

Efficiency of separation of the unsplit nuts:

$$\frac{180}{180} \times 100 = 100\%$$

Thus the separation of pistachio nuts into free fractions: the split nuts, the unsplit nuts with developed kernels, and the unsplit nuts with no or shriveled kernels, was accomplished with a high degree of efficiency.

Having thus described the invention, I claim:

1. A process of sorting a lot of pistachio nuts containing split nuts and unsplit nuts which comprises introducing said lot of nuts into a body of water, applying centrifugal action to the mixture of nuts and water to an extent sufficient to displace air trapped within the shells of the split nuts, discontinuing the application of the centrifugal action to permit the nuts to separate into a floater fraction and a sinker fraction and separately removing said fractions from the body of water, the said floater fraction having an increased proportion of unsplit nuts as compared with their proportion in the original lot, said sinker fraction having an increased proportion of split nuts as compared with their proportion in the original lot.

2. A process of sorting a lot of pistachio nuts containing split nuts and unsplit nuts which comprises introducing said lot of nuts into a body of water, applying mechanical force to rotate the nuts at a velocity which develops centrifugal force adequate to displace air trapped within the shells of the split nuts, discontinuing the application of the mechanical force to permit the nuts to separate into a floater fraction and a sinker fraction, and separately removing said fractions from the body of water, the said floater fraction having an increased proportion of unsplit nuts as compared with the proportion thereof in the original lot, said sinker fraction having an increased proportion of split nuts as compared with the proportion thereof in the original lot.

References Cited in the file of this patent

UNITED STATES PATENTS

| | | |
|---|---|---|
| 2,422,657 | Cleveland | June 24, 1947 |
| 2,530,676 | Berg et al. | Nov. 21, 1950 |